Patented June 14, 1932

1,863,268

UNITED STATES PATENT OFFICE

FITZGERALD DUNNING, OF BALTIMORE, MARYLAND

HYDROXY MERCURI DERIVATIVES OF RESORCIN IODINATED SULPHONE PHTHALEINS

No Drawing.    Application filed February 23, 1929.   Serial No. 342,318.

This invention relates to products which consist essentially of hydroxy-mercuri derivatives of resorcin di- or tetra-iodinated sulphone phthaleins. Of the numerous theoretically possible substituted phenol sulphone phthaleins the resorcin sulphone phthaleins containing iodine substituted in the o-sulpho-benzoic acid nucleus of the molecule and hereinafter referred to as resorcin iodinated sulphone phthalein have been found to yield mercury derivatives which are particularly suitable and effective as antiseptic and germicidal agents. My invention embraces both the mono- and the di-hydroxy-mercuri derivatives of the resorcin di- and tetra-iodinated sulphone phthaleins which derivatives may be either in the form of their water-insoluble free acids or in the form of their water-soluble mono- or di-alkali metal compounds and are characterized by freedom from contamination by alkali metal salts, such as sodium acetate and sodium chloride, and complex mercurials containing an acid radical attached to the mercury, such as are apt to be present in products of the customary mercuriation processes in which, for instance, mercuric acetate and mercuric chloride are used as mercurating agents.

The products are prepared by mercurating, as hereinafter described, the resorcin di- and tetra-iodinated sulphone phthaleins which phthaleins may be prepared by the process described in an application of Wilton C. Harden Ser. No. 267,473, filed April 4, 1928, said process involving the use of halogenated o-sulpho-benzoic acids or their anhydrides or salts which may be prepared as described in an application of Daniel Twiss Ser. No. 267,483, filed April 4, 1928.

The halogenated o-sulpho-benzoic acids and their anhydrides and salts are prepared by halogenating o-sulpho-benzoic acid, its anhydride or salts in fuming sulphuric acid. In general, the o-sulpho-benzoic acid, its anhydride or salt is dissolved in fuming sulphuric acid, the solution is heated in an oil bath to about 60–100° C. and the halogen is slowly added. After the requisite amount of halogen has been added, the reaction is completed by raising the temperature to about 150 to 170° C. Upon cooling the resulting reaction mixture the halogenated o-sulpho-benzoic acid anhydride precipitates and may be separated by direct filtration or by mixing with ice water and filtering at low temperature.

For example:

(1) Preparation of di-iodinated-o-sulpho-benzoic acid—

120 grams of o-sulpho-benzoic acid (or the corresponding amount of the anhydride or of the acid ammonium salt) are dissolved in 400 grams of 35% fuming sulphuric acid, the solution is heated in an oil bath at 80 to 85° C., 120 grams of iodine are slowly added, the temperature of the oil bath is raised to 150 to 160° C. to complete the reaction, the reaction mass is cooled, poured onto ice and the so precipitated di-iodinated-o-sulpho-benzoic acid anhydride is filtered off at low temperature. At room temperature the anhydride goes over into the acid.

(2) Preparation of tetra-iodinated-o-sulpho-benzoic acid—

50.5 grams of o-sulpho-benzoic acid (or a corresponding amount of the anhydride or of the acid ammonium salt) are dissolved in 300 grams of 60% fuming sulphuric acid, the solution is heated in an oil bath at 80 to 85° C., 127 grams of iodine are gradually added, the temperature of the oil bath is raised to 160 to 170° C. to complete the reaction, the reaction mixture is cooled and the tetra-iodinated-o-sulpho-benzoic acid anhydride so precipitated is separated by filtration.

The resorcin di- and tetra-iodinated sulphone phthaleins are prepared from the di- and tetra-iodinated-o-sulpho-benzoic acids by condensing said acids or their anhydrides with resorcin. The condensation is brought about generally by heating a mixture of the resorcin and the iodinated-o-sulpho-benzoic acid or its anhydride at a temperature in the neighborhood of 120 to 170° C. in the absence or presence of a condensing agent, such as $SnCl_4, ZnCl_2, H_2SO_4$, etc.

(3) Preparation of resorcin di-iodinated sulphone phthalein—

45.3 grams ($\frac{1}{10}$ mol) of di-iodinated-o- sulpho-benzoic acid (or the corresponding amount of anhydride) are heated with 60 grams of resorcin in an oil bath at 160 to 170° C. for several hours. The melt is poured into water and the excess resorcin removed by steam distillation. The compound is then dissolved in Na$_2$CO$_3$ solution, filtered, precipitated with strong acid and crystallized from benzene or other suitable solvent. The product is the free acid of resorcin di-iodinated sulphone phthalein and may be converted into its alkali metal salt by dissolving in a solution of the calculated quantity of caustic alkali and evaporating to dryness. The resorcin tetra-iodinated sulphone phthalein is prepared essentially as described in the foregoing example by substituting the corresponding quantity of tetra-iodinated-o-sulpho-benzoic acid for the 45.3 grams of di-iodinated-o-sulpho-benzoic acid of said example.

The preparation of the mercury derivaties of the resorcin di- and tetra-iodinated sulphone phthaleins is illustrated by the following examples:

(4) 620 grams (1 mol) of resorcin di-iodinated sulphone phthalein is dissolved in 1 liter of hot 2 normal aqueous sodium hydroxide solution; the resulting solution is diluted with 2 liters of water; 220 grams of mercuric oxide is added; the mixture is boiled under reflux until all the mercuric oxide is dissolved; the solution is allowed to stand overnight, filtered, and evaporated to dryness on a water bath or in vacuum. The product so obtained is essentially the di-sodium compond of mono-hydroxy mercuri resorcin di-iodinated sulphone phthalein. It is in the form of dark brown scales. It is readily soluble in water giving a red-brown solution having a slight fluorescence. It dissolves clearly in ammonium sulphide, therefore no ionic mercury is present. Tests indicate the absence of any extraneous alkali metal salts, and analysis of the compound for mercury, iodine and sulphur shows that its composition corresponds very closely to the theoretical formula:

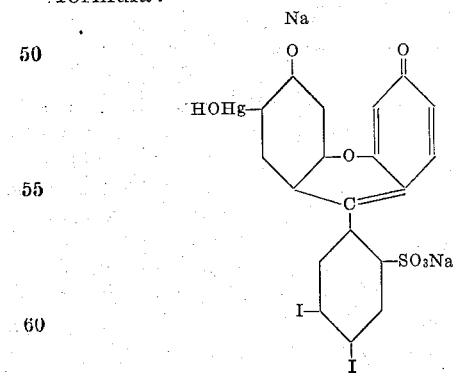

By using 1 liter of normal aqueous sodium hydroxide solution in the above example, the mono-sodium compound of mono-hydroxy mercuri resorcin di-iodinated sulphone phthalein is obtained.

By using 440 grams of mercuric oxide in place of 220 grams, in the above example, and boiling the mixture for several hours, the di-sodium compound of dihydroxy mercuri resorcin di-iodinated sulphone phthalein is formed, and may be obtained in the form of dark brown scales. Its solution in water has a slightly deeper color than the mono-mercury derivative and no fluorescence. Tests will also show its purity and analysis for mercury, iodine and sulphur indicates that it has essentially the following formula:

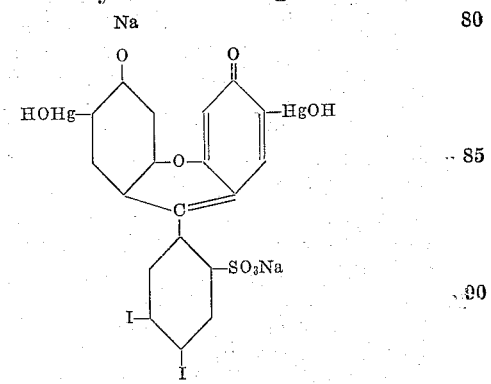

(5) 872 grams (1 mol) of resorcin tetra-iodinated sulphone phthalein is dissolved in 1 liter of hot 2 normal aqueous sodium hydroxide solution; this solution is diluted with 2 liters of water; 220 grams of mercuric oxide is added; and the solution boiled under a reflux until all the mercuric oxide is dissolved; the solution is allowed to stand overnight, filtered, and the filtrate evaporated to dryness in vacuum. The product so obtained is essentially the di-sodium compound of mono-hydroxy-mercuri resorcin tetra-iodinated sulphone phthalein. It is obtained in the form of very dark brown scales, which give a clear dull red-brown solution in water. It dissolves clearly in ammonium sulphide, showing absence of ionic mercury. Tests indicate absence of any extraneous alkali metal salts, and analysis of the compound for mercury, iodine, and sulphur shows that its composition corresponds very closely to the formula:

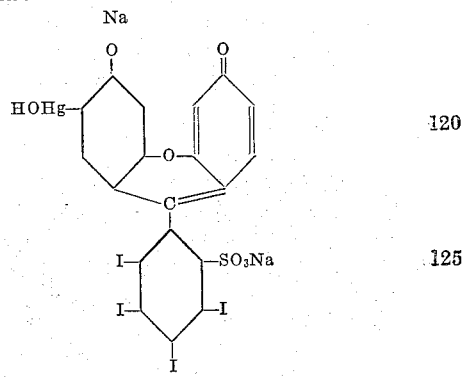

By using 440 grams of mercuric oxide in place of 220 grams in the above example and boiling for several hours, the product obtained is the di-sodium salt of di-hydroxy-mercuri resorcin tetra-iodinated sulphone phthalein.

The respective mono-sodium compound can be prepared by using 1 liter of normal aqueous sodium hydroxide solution.

The free acid form of these compounds may be prepared by cautiously precipitating with sufficient $\frac{N}{2}$ hydrochloric acid, added slowly with rapid stirring at a temperature of about 60° C. This precipitate is filtered, washed with very dilute hydrochloric acid, and dried.

These compounds have been found, by reason of their nature and unusual purity, to possess powerful bactericidal properties coupled with low toxicity, and may be used generally in the treatment of infections.

I claim:

1. As a new product a hydroxy-mercuri resorcin iodinated sulphone phthalein, free of extraneous alkali metal salt and complex mercurial containing an acid radical attached to the mercury and being iodinated in the o-sulpho-benzoic acid nucleus.

2. As a new product a water-soluble alkali metal compound of a hydroxy-mercuri resorcin iodinated sulphone phthalein, free of extraneous alkali metal salt and complex mercurial containing an acid radical attached to the mercury and being iodinated in the o-sulpho-benzoic acid nucleus.

3. As a new product a water-soluble sodium compound of a hydroxy-mercuri resorcin iodinated sulphone phthalein, free of extraneous alkali metal salt and complex mercurial containing an acid radial attached to the mercury and being iodinated in the o-supho-benzoic acid nucleus.

4. As a new product the di-sodium compound of a hydroxy-mercuri resorcin iodinated sulphone phthalein, free of extraneous alkali metal salt and complex mercurial containing an acid radical attached to the mercury and being iodinated in the o-sulpho-benzoic acid nucleus.

5. As a new product a hydroxy-mercuri resorcin tetra-iodinated sulphone phthalein, free of extraneous alkali metal salt and complex mercurial containing an acid radical attached to the mercury.

6. As a new product a water-soluble alkali metal compound of a hydroxy-mercuri resorcin tetra-iodinated sulphone phthalein, free of extraneous alkali metal salt and complex mercurial containing an acid radical attached to the mercury.

7. As a new product a water-soluble sodium compound of a hydroxy-mercuri resorcin tetra-iodinated sulphone phthalein, free of extraneous alkali metal salt and complex mercurial containing an acid radical attached to the mercury.

8. As a new product the di-sodium compound of a hydroxy-mercuri resorcin tetra-iodinated sulphone phthalein, free of extraneous alkali metal salt and complex mercurial containing an acid radical attached to the mercury.

9. As a new product a mono-hydroxy-mercuri resorcin iodinated sulphone phthalein, free of extraneous alkali metal salt and complex mercurial containing an acid radical attached to the mercury and being iodinated in the o-sulpho-benzoic acid nucleus.

10. As a new product a water-soluble alkali metal compound of a mono-hydroxy-mercuri resorcin iodinated sulphone phthalein, free of extraneous alkali metal salt and complex mercurial containing an acid radical attached to the mercury and being iodinated in the o-sulpho-benzoic acid nucleus.

11. As a new product a water-soluble sodium compound of a mono-hydroxy-mercuri resorcin iodinated sulphone phthalein, free of extraneous alkali metal salt and complex mercurial containing an acid radical attached to the mercury and being iodinated in the o-sulpho-benzoic acid nucleus.

12. As a new product the di-sodium compound of a mono-hydroxy-mercuri resorcin iodinated sulphone phthalein, free of extraneous alkali metal salt and complex mercurial containing an acid radical attached to the mercury and being iodinated in the o-sulpho-benzoic acid nucleus.

13. As a new product the mono-hydroxy-mercuri resorcin tetra-iodinated sulphone phthalein, free of extraneous alkali metal salt and complex mercurial containing an acid radical attached to the mercury.

14. As a new product a water-soluble alkali compound of the mono-hydroxy-mercuri resorcin tetra-iodinated sulphone phthalein, free of extraneous alkali metal salt and complex mercurial containing an acid radical attached to the mercury.

15. As a new product a water soluble sodium compound of the mono-hydroxy-mercuri resorcin tetra-iodinated sulphone phthalein, free of extraneous alkali metal salt and complex mercurial containing an acid radical attached to the mercury.

16. As a new product the di-sodium compound of mono-hydroxy-mercuri resorcin tetra-iodinated sulphone phthalein, free of extraneous alkali metal salt and complex mercurial containing an acid radical attached to the mercury.

In testimony whereof, I affix my signature.

FITZGERALD DUNNING.